United States Patent [19]
Komma et al.

[11] Patent Number: 5,594,713
[45] Date of Patent: Jan. 14, 1997

[54] OPTICAL PICKUP HEAD APPARATUS

[75] Inventors: Yoshiaki Komma, Kyoto; Seiji Nishino, Osaka; Makoto Kato, Nishinomiya; Kaoru Matsuda, Osaka, all of Japan

[73] Assignee: Matsushita Electric Industrial Co., Ltd., Osaka, Japan

[21] Appl. No.: 564,745

[22] Filed: Nov. 29, 1995

Related U.S. Application Data

[62] Division of Ser. No. 932,112, Aug. 19, 1992, Pat. No. 5,495,461.

[30] Foreign Application Priority Data

Aug. 22, 1991 [JP] Japan .................................. 3-210676
Jan. 8, 1992 [JP] Japan .................................. 4-1313

[51] Int. Cl.$^6$ ..................................................... G11B 7/00
[52] U.S. Cl. ........................ 369/112; 369/103; 369/110; 369/120; 349/19
[58] Field of Search ............................ 369/44.12, 103, 369/109, 110, 112, 44.23, 120; 359/55, 36

[56] References Cited

U.S. PATENT DOCUMENTS

| | | | |
|---|---|---|---|
| 4,358,200 | 11/1982 | Heemskerk | 369/44.23 |
| 4,929,823 | 5/1990 | Kato et al. | 250/201.5 |
| 5,062,098 | 10/1991 | Hori et al. | 369/44.12 |
| 5,095,472 | 3/1992 | Uchino et al. | 369/44.14 |
| 5,210,627 | 5/1993 | Toide et al. | 359/40 |
| 5,361,244 | 11/1994 | Nakamura et al. | 369/44.23 |
| 5,495,461 | 2/1996 | Komma et al. | 369/103 |

FOREIGN PATENT DOCUMENTS 3-125341  5/1991  Japan .
3-150744  6/1991  Japan .

*Primary Examiner*—Georgia Y. Epps
*Assistant Examiner*—Kim-Kwok Chu
*Attorney, Agent, or Firm*—Lowe, Price, LeBlanc & Becker

[57] ABSTRACT

An optical pickup head apparatus comprising: a light source; an imaging optics for receiving a linearly polarized light beam emitted from the light source, and converges it on a small spot on an information medium; photodetector units for receiving the light beam being reflected and diffracted at the information medium and output electric signals corresponding to received light quantities; a liquid crystal hologram consisting of a pair of transparent substrates, a liquid crystal sandwiched therebetween through a pair of transparent electrodes, either of the transparent electrodes being formed with a hologram pattern; and a Faraday rotator for rotating a polarized direction of light beam by 45 degrees in a light path leading from the light source to the information medium and, further, rotates the polarized direction of the light beam by 45 degrees in its opposite light path. The liquid crystal hologram is applied a constant voltage so that the light beam reflected at the information medium is diffracted in the liquid crystal hologram to generate ±1-order diffraction light beams, and the photodetector units sense both of light quantities of said ±1-order diffraction light beams emitted from the liquid crystal hologram. Then, a subtraction between signals representing the light quantities is calculated so as to obtain an information signal.

13 Claims, 14 Drawing Sheets

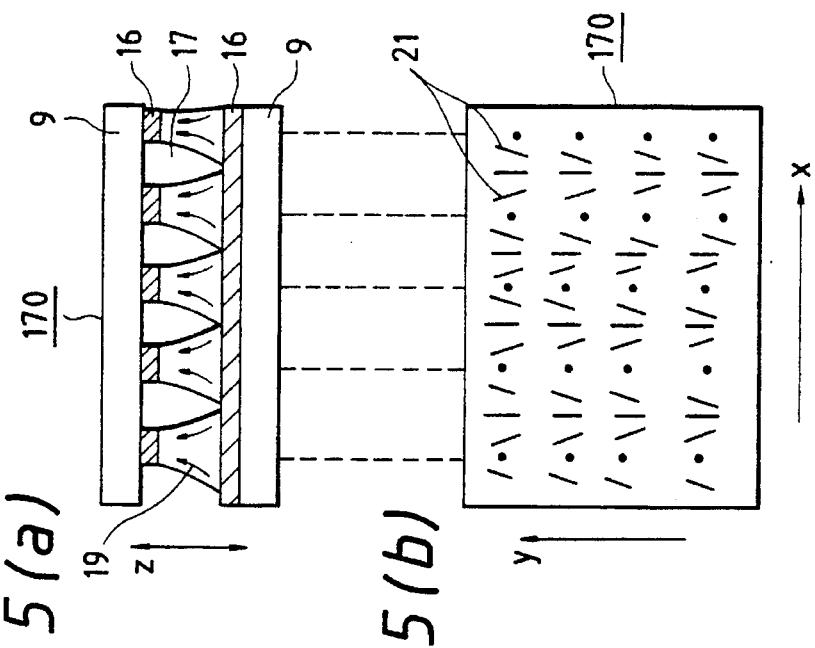
FIG. 5(a)
FIG. 5(b)
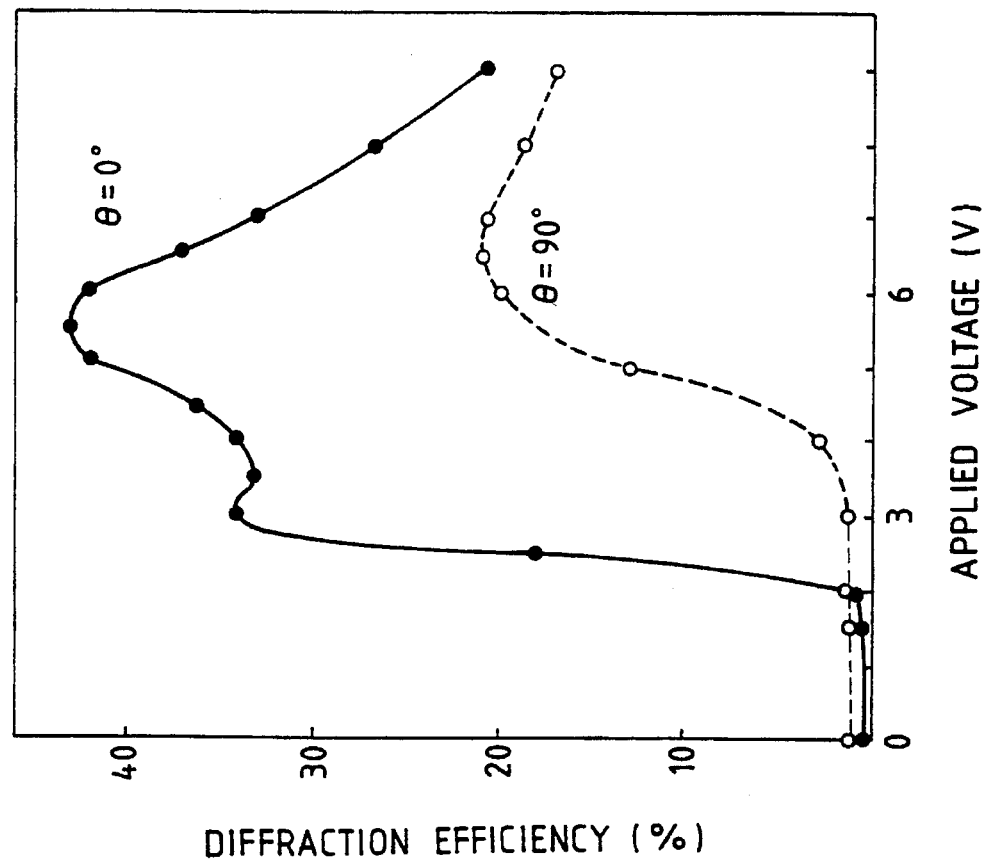
FIG. 4

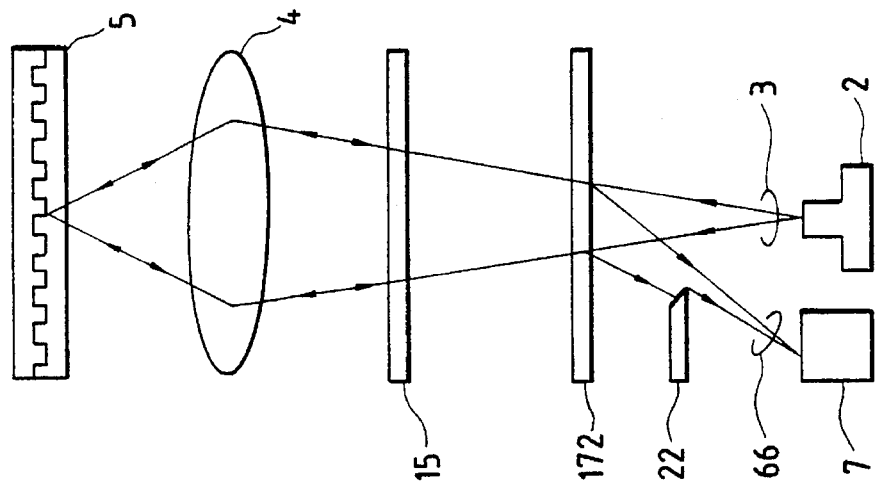
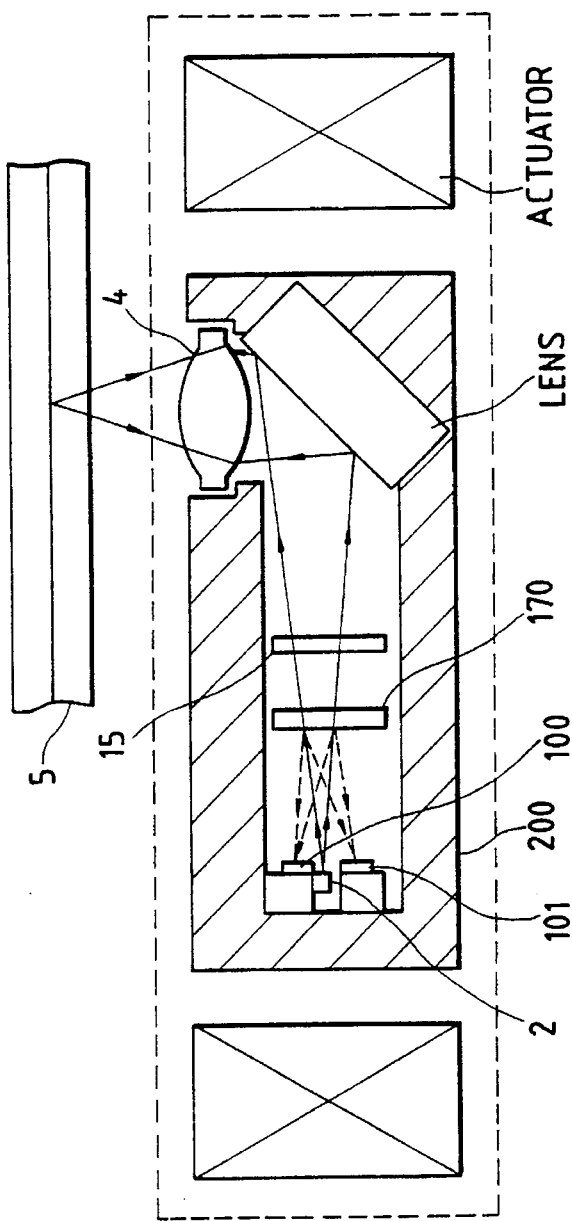

OPTICAL PICKUP HEAD APPARATUS

CROSS REFERENCE OF RELATED APPLICATION

This application is a division of U.S. application Ser. No. 07/932,112, filed on Aug. 19, 1992, now U.S. Pat. No. 5,495,461 issued on Feb. 27, 1996.

BACKGROUND OF THE INVENTION

1. Field of the Invention

The present invention relates to an optical pickup head for optically recording, reproducing, or erasing information on or from an optical or magneto-optical medium such as an optical disk or an optical card.

2. Description of the Prior Art

An optical memory technology using an optical disk having pit-pattern has been expanding its utilization field as a high-density and large-capacity recording medium, so as to be used as a digital audio disk, a video disk, a floppy disk, and further a data file.

For such an optical memory technology, it is important to accurately carry out the recording on or reproducing from the optical disk through optical beam squeezed in a thin beam with high reliability. This mechanism largely depends on its optical system in reliability.

An optical head generally serves as an essential part of the optical system. Basic functions of the optical head are roughly categorized into a convergence for forming a diffraction-limited small spot, a focusing servo and tracking control in the optical system, and pit signal (information signal) detection.

These functions are embodied by various combinations of optical systems and photo-electrical conversion detecting systems on the basis of their purposes and uses. Especially, an optical pickup head apparatus using hologram has been recently introduced in order to reduce the size of optical pickup head apparatus itself and manufacture it thin.

As an example of prior art, FIGS. 24 and 25 show a constitution of an optical pickup head disclosed by J. C. LEHUREAU, J. Y. BEGUIN and J. COLINEAU; "Polarizing Grating Beamsplitter Using a Liquid Crystal Cell", Proc. Int. Symp. on Optical Memory, 1989 Japanese Journal of Applied Physics, Vol. 28 (1989) Supplement 28-3, pp. 201–203.

In FIG. 24, a reference numeral 2 denotes a radiation light source; for example, a semiconductor laser. A linearly polarized light beam 3 (a laser beam) emitted from this light source 2 passes through a liquid crystal hologram 172 and, in turn, is converted into a circular polarized beam by means of a quarter wavelength plate 15. Then, the circular polarized beam enters into an objective lens 4 and converges onto an information medium 5.

After reflection at the information medium 5, the rotational direction of the circular polarized beam is reversed. Then the light beam 3 travels the same light path in an opposite direction, and enters again into the quarter wavelength plate 15. In the quarter wavelength plate 15, the light beam 3 becomes a linearly polarized beam with a polarized direction rotated 90 degrees from its initial direction.

Subsequently, the light beam 3 enters into the liquid crystal hologram 172, and from which a +1-order diffraction,light beam 66 inters into a photodetector unit 7. By calculating outputs of the photodetector unit 7, servo signals (i.e. focus error signals and tracking error signals) and information signals can be obtained.

As shown in FIG. 25a and 25b, the liquid crystal hologram 172 consists of a pair of transparent substrates (glasses) 9 and 9, a polyimide 23 for forming a brazed hologram, a liquid crystal 17, and a pair of transparent electrodes 16 and 16.

An agent for orientating liquid crystal molecules and a sealing material are often used for the liquid crystal hologram 172 but are not related to the present invention. Therefore, they are not shown in the drawing. The liquid crystal 17 includes elliptic liquid crystal molecules 17a having a refractive index $n_S$ in its minor-axis direction and a refractive index $n_l$ in its major-axis direction. In this case, the refractive index $n_S$ is selected to be substantially the same as a refractive index $n_P$ of the polyimide 23 and the refractive index $n_l$ is largely different from the refractive index $n_P$.

When a light beam 3 being linearly polarized in the minor axis direction (i.e. direction 1) of the liquid crystal 17 oriented in this liquid crystal hologram 172 is entered into the liquid crystal hologram 172, no diffraction is generated since the polyimide 23 and the liquid crystal 17 have substantially the same refractive index ($n_S \approx n_P$).

On the contrary, when a light beam 3 being linearly polarized in a different direction (i.e. direction 2) normal to the above-described polarized direction is entered into the liquid crystal hologram 172, a diffraction is generated due to a refractive index difference between the liquid crystal 17 and the polyimide 23 ($n_e \ne n_P$). Furthermore, since the polyimide 23 is brazed as shown in FIG. 25a and 25b, +1-order diffraction light beam becomes strong.

By utilizing above-described property of such a liquid crystal hologram 172, if the light beam 3 is emitted in FIG. 24 so that a polarized direction of the light beam 3 becomes parallel with the direction 1, no diffraction occurs in a light beam path (forward light beam path) leading from the radiation light source 2 to the information medium 5 but the diffraction efficiency of the +1-order diffraction light beam becomes high in its opposite light beam path (backward light beam path) leading from the information medium 5 to the radiation light source 2.

Accordingly it is concluded that the efficiency of use of light beam in the forward and backward light beam paths is high. Hereupon, the efficiency of use of light beam in the forward and backward light beam paths is defined in general by multiplying the light quantity (0-order diffraction light quantity) passing through the hologram 172 in the forward light beam path and the +1-order diffraction light quantity emitted from the hologram in the backward light beam path.

According to this prior art, a focusing error (FE) signal is sensed by Foucault method or by astigmatic method. However, in the case where the Foucault method is adopted, a mechanical knife edge 22 shown in FIG. 24 must be additionally installed. On the other hand, in the case where the astigmatic method is adopted, a cylindrical lens must be additionally installed. In any case, there was a problem that the number of parts increased and therefore it resulted in cost up.

One method for solving above-described problem is to give a curvature on a hologram curve of the liquid crystal hologram 172. However, as is mentioned in the above-introduced reference paper, it is known that manufacturing a brazed hologram to have a curvature on its hologram pattern has been quite difficult.

Furthermore, this prior art mentions that the liquid crystal hologram can be generally used as a substitution for one polarized beamsplitter in an optical pickup head apparatus for a magneto-optical disk requiring more than two polarized beamsplitters. However, this is only effective in reducing size of one component, and does not result in a sufficient overall reduction in size of optical pickup head apparatus.

SUMMARY OF THE INVENTION

Accordingly, the present invention has a purpose to provide an optical pickup head apparatus which can be constituted by a minimum number of parts, can be manufactured compact in size and light in weight at low cost, and detect a change of polarized angle caused by not only a read-only optical disk but also by a magneto-optical disk.

In order to accomplish above purposes, a first aspect the present invention provides an optical pickup head apparatus comprising: a radiation light source; an imaging optics which receives a linearly polarized light beam emitted from said radiation light source, and converges the linearly polarized light beam to a small spot on an information medium; photodetector units including a plurality of photodetectors which receive the light beam being reflected and diffracted the information medium and output electric signals in accordance with received light quantities; a liquid crystal hologram which is constituted by a pair of transparent substrates, a liquid crystal sandwiched between these transparent substrates, and a pair of transparent electrodes disposed between the liquid crystal and the transparent substrates, either of said transparent electrodes being formed with a hologram pattern;

- a quarter wavelength plate which converts said linearly polarized light beam into a circular polarized light beam in a forward light path leading from said radiation light source to said information medium and, to the contrary, restores thus converted circular polarized light beam into a linearly polarized light beam in a backward light path leading from said information medium to the radiation light source;
- said liquid crystal hologram being applied a constant voltage so that said light beam reflected at the information medium is diffracted in the liquid crystal hologram to generate ±1-order diffraction light beams; and
- said photodetector units sensing both of light quantities of said ±1-order diffraction light beams emitted from the liquid crystal hologram and calculating a summation between signals representing said light quantities so as to obtain an information signal.

And, a second aspect of the present invention provides an optical pickup head apparatus comprising: a radiation light source; an imaging optics which receives a linearly polarized light beam emitted from said radiation light source, and converges the linearly polarized light beam to a small spot on an information medium; photodetector units including a plurality of photodetectors which receive the light beam being reflected and diffracted at the information medium and output electric signals in accordance with received light quantities; a liquid crystal hologram which is constituted by a pair of transparent substrates, a liquid crystal sandwiched between these transparent substrates, and a pair of transparent electrodes disposed between the liquid crystal and the transparent substrates, either of said transparent electrodes being formed with a hologram pattern;

- one transparent substrate located closer to said information medium of said two transparent substrates constituting the liquid crystal hologram being made by a quarter wavelength plate which converts said linearly polarized light beam into a circular polarized light beam in a forward light path leading from said radiation light source to said information medium and, to the contrary, restores thus converted circular polarized light beam into a linearly polarized light beam in a backward light path leading from said information medium to the radiation light source;
- said liquid crystal hologram being applied a constant voltage so that said light beam reflected at the information medium is diffracted in the liquid crystal hologram to generate ±1-order diffraction light beams; and
- said photodetector units sensing both of light quantities of said ±1-order diffraction light beams emitted from the liquid crystal hologram and calculating a summation between signals representing said light quantities so as to obtain an information signal.

Furthermore, a third aspect of the present invention provides an optical pickup head apparatus comprising: a radiation light source; an imaging optics which receives a linearly polarized light beam emitted from said radiation light source, and converges the linearly polarized light beam to a small spot on an information medium; photodetector units including a plurality of photodetectors which receive the light beam being reflected and diffracted at the information medium and output electric signals in accordance with received light quantities; a liquid crystal hologram which is constituted by a pair of transparent substrates, a liquid crystal sandwiched between these transparent substrates, and a pair of transparent electrodes disposed between the liquid crystal and the transparent substrates, either of said transparent electrodes being formed with a hologram pattern;

- a Faraday rotator which rotates a polarized direction of said light beam by 45 degrees in a forward light path leading from said radiation light source to said information medium and, further, rotates the polarized direction of said light beam by 45 degrees in a backward light path leading from said information medium to the radiation light source;
- said liquid crystal hologram being applied a constant voltage so that said light beam reflected by the information medium is diffracted in the liquid crystal hologram to generate ±1-order diffraction light beams; and
- said photodetector units sensing both of light quantities of said ±1-order diffraction light beams emitted from the liquid crystal hologram and calculating a subtraction between signals representing said light quantities so as to obtain an information signal.

Moreover, a fourth aspect of the present invention provides an optical pickup head apparatus comprising: a radiation light source; an imaging optics which receives a linearly polarized light beam emitted from said radiation light source, and converges the linearly polarized light beam to a small spot on an information medium; photodetector units including a plurality of photodetectors which receive the light beam being reflected and diffracted at the information medium and output electric signals in accordance with received light quantities; a liquid crystal hologram which is constituted by a pair of transparent substrates, a liquid crystal sandwiched between these transparent substrates, and a pair of transparent electrodes disposed between the liquid crystal and the transparent substrates, either of said transparent electrodes being formed with a hologram pattern;

- one of said two transparent substrates constituting the liquid crystal hologram being made by a dielectric substrate serving as one component of a Faraday rotator which rotates a polarized direction of said light beam by 45 degrees in a forward light path leading from said radiation light source to said information medium and, further, rotates the polarized direction of said light beam by 45 degrees in a backward light path leading from said information medium to the radiation light source;

said liquid crystal hologram being applied a constant voltage so that said light beam reflected at the information medium is diffracted in the liquid crystal hologram to generate ±1-order diffraction light beams; and said photodetectors sensing both of light quantities of said ±1-order diffraction light beams emitted from the liquid crystal hologram and calculating a subtraction between signals representing said light quantities so as to obtain an information signal.

Still further, a fifth embodiment of the present invention provides an optical pickup head apparatus comprising: a radiation light source; an imaging optics which receives a linearly polarized light beam emitted from said radiation light source, and converges the linearly polarized light beam to a small spot on an information medium;

photodetector units including a plurality of photodetectors which receive the light beam being reflected and diffracted at the information medium and output electric signals in accordance with received light quantities; a liquid crystal hologram which is constituted by a pair of transparent substrates, a liquid crystal sandwiched between these transparent substrates, and a pair of transparent electrodes disposed between the liquid crystal and the transparent substrates, either of said transparent electrodes being formed with a hologram pattern;

a Faraday rotator which rotates a polarized direction of said light beam by 45 degrees in a forward light path leading from said radiation light source to said information medium and, further, rotates the polarized direction of said light beam by 45 degrees in a backward light path leading from said information medium to the radiation light source;

said liquid crystal hologram being applied a high voltage in the case where information signal is read out higher than the case where information signal is written in, so that said light beam reflected at the information medium is diffracted in the liquid crystal hologram to generate ±1-order diffraction light beams; and said photodetectors sensing both of light quantities of said ±1-order diffraction light beams emitted from the liquid crystal hologram and calculating a subtraction between signals representing said light quantities so as to obtain the information signal.

Yet further, a sixth aspect of the present invention provides an optical pickup head apparatus comprising: a radiation light source; an imaging optics which receives a linearly polarized light beam emitted from said radiation light source, and converges the linearly polarized light beam to a small spot on an information medium; photodetector units including a plurality of photodetectors which receive the light beam being reflected and diffracted at the information medium and output electric signals in accordance with received light quantities; a liquid crystal hologram which is constituted by a pair of transparent substrates, a liquid crystal sandwiched between these transparent substrates, and a pair of transparent electrodes disposed between the liquid crystal and the transparent substrates, either of said transparent electrodes being formed with a hologram pattern;

one of said two transparent substrates constituting the liquid crystal hologram being made by a dielectric substrate serving as one component of a Faraday rotator which rotates a polarized direction of said light beam by 45 degrees in a forward light path leading from said radiation light source to said information medium and, further, rotates the polarized direction of said light beam by 45 degrees in a backward light path leading from said information medium to the radiation light source;

said liquid crystal hologram being applied a high voltage in the case where information signal is read out higher than the case where information signal is written in, so that said light beam reflected at the information medium is diffracted in the liquid crystal hologram to generate ±1-order diffraction light beams; and said photodetectors sensing both of light quantities of said ±1-order diffraction light beams emitted from the liquid crystal hologram and calculating a subtraction between signals representing said light quantities so as to obtain the information signal.

With these arrangements, the optical pickup head can be constituted by the liquid crystal hologram and the quarter wavelength plate or the Faraday rotator, which results in improvement in utilization efficiency and results in S/N ratio of a servo signal or an information signal.

The liquid crystal hologram adopted in the present invention can be obtained by merely pattering transparent electrodes to form a hologram pattern by use of photo-mask manufactured as an application of an integrated circuit technology. Namely, no manufacturing of brazed cross-sectional configuration is required. This is advantageous in make the hologram pattern have curvature, or in exchanging the hologram pattern partly with a different hologram pattern.

The present invention utilizes the fact that, when a certain value voltage is applied to the liquid crystal hologram, the +1-order diffraction light beam and the −1-order diffraction light beam change complimentarily in accordance with a polarization angle of incident light beam. That is, a polarization angle change; i.e. an information signal of magneto-optical disk, can be detected by the subtraction between an electric signal generated from the photo-detector upon receipt of the +1-order diffraction light beam and an electric signal generated from the photo-detector upon receipt of the −1-order diffraction light beam.

Thus obtained information signal is advantageous in its stability. This is, this information signal is derived from differential detection between the +1-order diffraction light beam and the −1-order diffraction light beam. Therefore, bad affection of light quantity variation caused by the change of the radiation light source itself or by flaw of the information medium can be canceled by the differential nature.

Still further, an optical pickup head apparatus capable of detecting the polarization angle change by the magnetic disk can be constituted at low cost by use of the minimum number of components, so as to realize a light weight device.

The above and other objects, features and advantages of the present invention will become more apparent from the following detailed description which is to be read in conjunction with the accompanying drawings.

BRIEF DESCRIPTION OF THE DRAWINGS

FIG. 4 is a graph showing changes of diffraction efficiencies in the case where various voltages are applied to the liquid crystal hologram of the first embodiment of the present invention;

FIGS. 5(a)–5(b) is an illustrative view showing orientations of liquid crystal molecules in the case where a high voltage is applied to the liquid crystal hologram of a second embodiment of the present invention;

FIG. 23 is a schematic cross-sectional view showing an optical pickup head apparatus in accordance with a fifth embodiment of the present invention;

FIG. 24 is a schematic cross-sectional view showing a conventional optical pickup head apparatus;

DETAIL DESCRIPTION OF THE PREFERRED EMBODIMENTS

Hereinafter, referring now to the accompanying drawings, embodiments of the present invention are explained in detail.

First Embodiment

Figure 1:
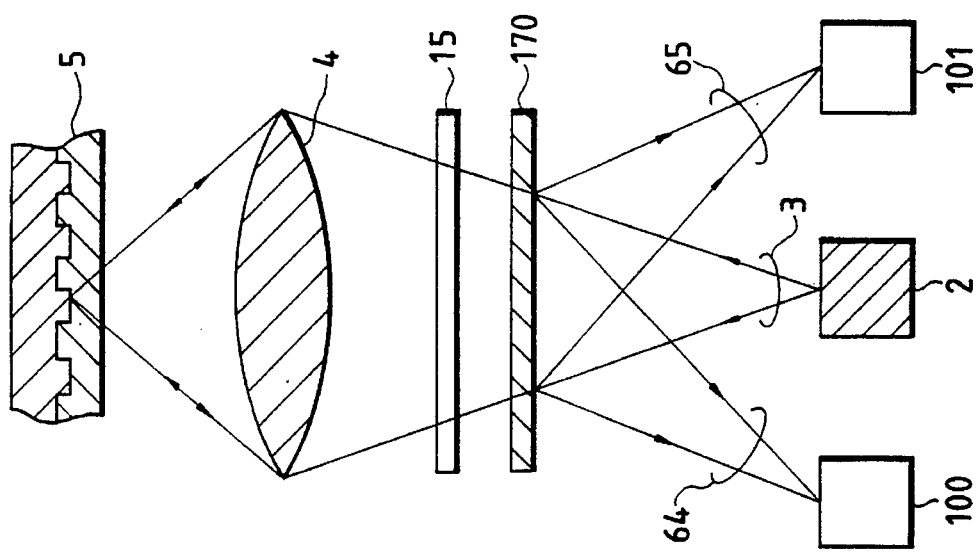
FIG. 1 is a schematic cross-sectional view showing an optical pickup head apparatus in accordance with a first embodiment of the present invention.

FIG. 1 is a view showing a constitution of a first embodiment of the present invention. A reference numeral 2 denotes a radiation light source such as a semiconductor laser or the like. On a forward light path leading from the light source 2 to an information medium 5, a linearly polarized light beam 3 (a laser light beam) emitted from this light source 2 passes through a liquid crystal hologram 170 and, in turn, is converted into a circular polarized light beam 3 by means of a quarter wavelength plate 15 to enter an objective lens 4. Then, after having passed through the objective lens 4, the light beam 3 is converged on the information medium 5. That is, the objective lens 4 constitutes an imaging optics of the present invention.

When the light beam 3 is reflected at the information medium 5, its rotational direction of the circular polarized light beam 3 is reversed. On a backward light path leading from the information medium 5 toward the light source 2, the light beam 3 returns along the same light path as the forward light path. Upon passing through the quarter wavelength plate 15, the light beam 3 is restored into a linearly polarized light beam 3 being rotated by total 90 degrees from its initial condition. Then, the light beam 3 enters into the liquid crystal hologram 170.

The liquid crystal hologram 170 serves to make the light beam 3 emit +1-order diffraction light beam 64 and −1-order diffraction light beam 65. These +1-order diffraction light beam 64 and −1-order diffraction light beam 65 are inputted into photodetector units 100 and 101, respectively. By calculating outputs from the photodetector units 100 and 101, servo-signals and information signals can be obtained.

Especially, in the case where information are read out on the basis of a change of incident light quantity reflected from the information medium 5 to the objective lens 4, it is possible to detect information signals by sensing these +1-order diffraction Light beam 64 and −1-order diffraction light beam 65 in the photodetector units 100 and 101, respectively, and thereafter obtaining a summation of outputs from these photodetector units 100 and 101, or obtaining an alternating-current component of thus calculated summation of the outputs.

Figure 2:
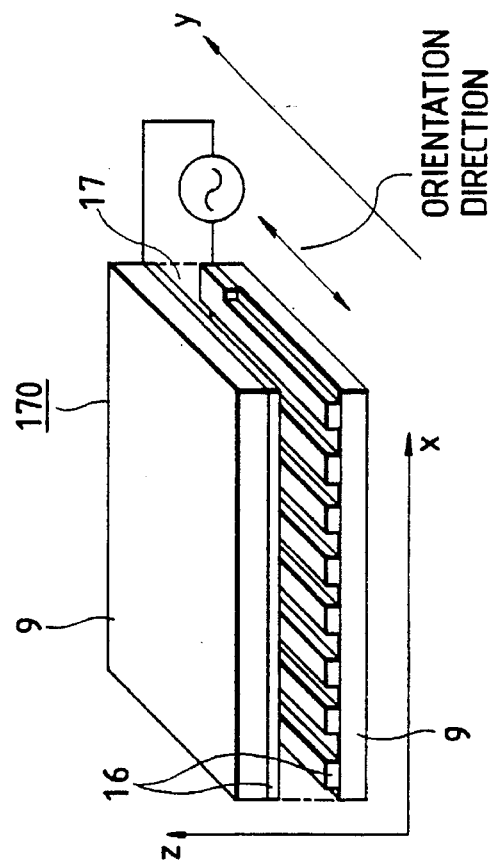
FIG. 2 is a perspective view showing a liquid crystal hologram serving as one component of the optical pickup head apparatus of the first embodiment of the present invention.

As shown in FIG. 2, the liquid crystal hologram 170 consists of a pair of transparent substrates (for example, glasses) 9 and 9, and a liquid crystal 17 interposed between these two transparent substrates through a pair of transparent electrodes 16 and 16. Namely, the liquid crystal 17 is sandwiched by the transparent substrates 9, 9 through transparent electrodes 16, 16 in an up-and-down direction.

Though an agent for orientating liquid crystal molecules and a sealing material are often used for the liquid crystal hologram, they are not directly related to the present invention and therefore omitted in the drawing.

Figure 3A:
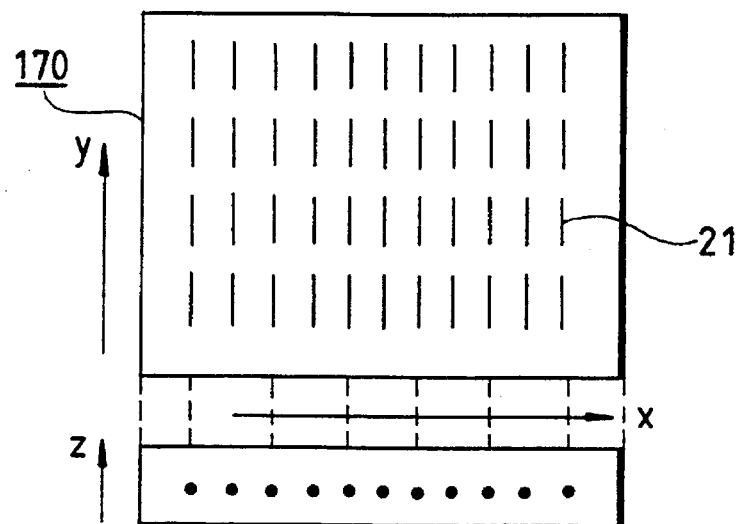
FIGS. 3(a)–3(c) are illustrative views showing orientations of liquid crystal molecules in the case where a low voltage is applied to the liquid crystal hologram of the first embodiment of the present invention.
Figure 3B:
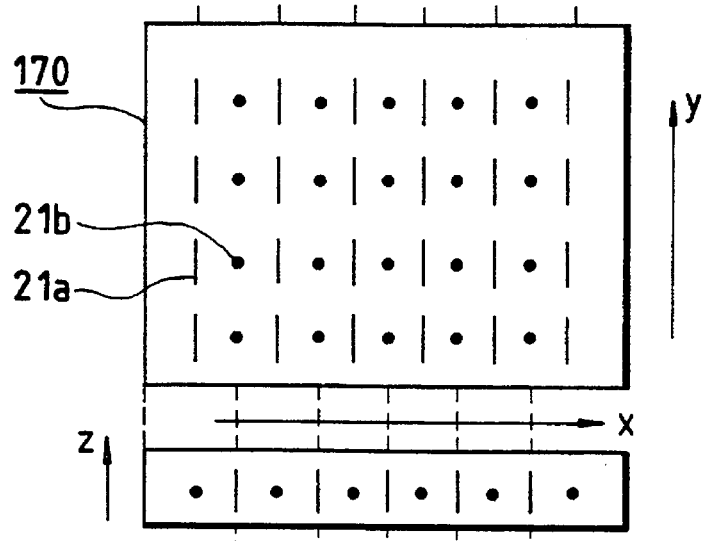
Figure 3C:
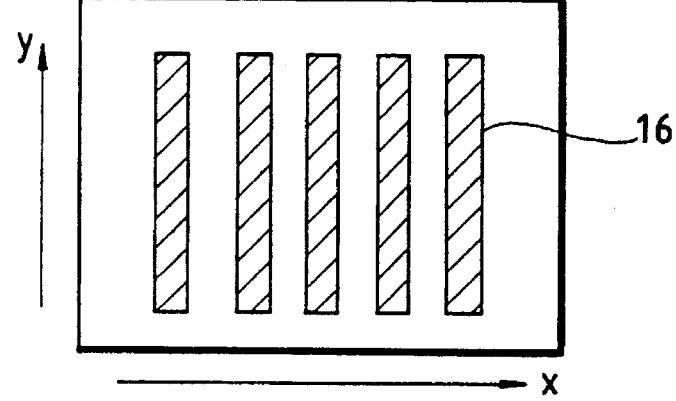

In this embodiment, either of the transparent electrodes 16, 16 is formed with a hologram pattern. FIGS. 3(a)–3(c) illustrate variations of liquid crystal molecules in the case where the transparent electrodes 16, 16 are applied a voltage, when seen from both of the top (i.e. Z-direction) and the side (i.e. Y-direction) of the liquid crystal hologram 170 shown in FIG. 2. In FIGS. 3(a)–3(c), reference numerals 21, 21a, and 21b show typical orientation directions of liquid crystal molecules.

When no voltage is applied, liquid crystal molecules are oriented in the same direction by use of a rubbing or orientation agent, as shown in FIG. 2(a). On the other hand when a significant voltage is applied, only the molecules with their both sides sandwiched by the transparent electrodes are affected by this voltage application such that their orientating directions are changed as shown in FIG. 2(b). Namely, the liquid crystal molecules applied the significant voltage are disposed to array their major axes along the up-and-down (Z-axis) direction. In the drawing, a dot-point (.) shows that its corresponding liquid crystal molecule stands vertically on the paper surface.

Under the condition shown in FIG. 2(b), if a linearly polarized light beam enters in the Y-direction (i.e. 0-degree polarized direction), a diffraction is generated due to refractive index difference between the major axis and the minor axis of the liquid crystal molecule since the liquid crystal molecules are arrayed as shown by reference numerals 21a and 21b in FIG. 3(b).

On the contrary, if a linearly polarized light beam enters in the X-direction (i.e. 90-degree polarized direction), a diffraction is not caused because the light beam is influenced only by the minor-axis-direction refractive indexes of the molecules 21a and 21b in the condition of FIG. 3(b).

Therefore, as is explained above, it will be understood that the liquid crystal hologram of the present invention has a polarizing anisotropy as well as the conventional hologram.

FIG. 4 shows an experimental result of diffraction efficiencies measured by supplying a linearly polarized laser beam into an actually manufactured liquid crystal hologram while applying an AC voltage of 3 KHz to this liquid crystal hologram. A reference symbol Θ denotes a polarized angle. An abscissa represents an applied voltage value, and an ordinate represents a diffraction efficient of 1-order diffraction light beam.

According to this experimental result, it was found that the highest quenching ratio is obtained when a voltage of approximately 3 V is applied to the liquid crystal hologram.

In FIG. 1, if the polarized direction of the light beam 3 is set toward the X-direction (90-degree polarized direction) of FIGS. 3(a)–3(c), no diffraction occurs in the forward light path leading from the radiation light source 2 to the information medium 5 by virtue of the above-described property of liquid crystal hologram 170.

However, on the backward light path, since the polarized direction is rotated 90 degrees (0-degree polarized direction) from the polarized direction of the incident light, the hologram 170 causes a diffraction. In other words, the diffraction efficiencies of ±1-order diffraction light beams become high.

Accordingly, extremely high is the efficiency of use of light beam in the forward and backward light beam paths which is defined by a multiplication of the light quantity (0-order diffraction light quantity) passing through the hologram 170 in the forward light beam path and the ±1-order diffraction light quantities emitted from the hologram 170 in the backward light beam path. Therefore, by utilizing a summation of signals obtained from the ±1-order diffraction light beams as an information signal, it becomes possible to constitute an optical pickup head having a high S/N ratio as an optical pickup head apparatus for a read-only or a phase modulation type optical disk.

The first embodiment is mainly explained based on a liquid crystal hologram. However, it should be noted that the present invention is not limited to the liquid crystal hologram. The reason why the liquid crystal hologram is selected as an element of the first embodiment is that it has polarizing anisotropy as explained above. Thus, it is easily understood that the liquid crystal hologram disclosed in the embodiment can be replaced by any other hologram having polarizing anisotropic nature, which is so-called "polarizing hologram beamsplitter". For example, lithium niobate, which has an anisotropic refractive index, would be used as a hologram element of the present invention when the crystal surface is proton exchanged so as to obtain a lattice formation.

Second Embodiment

Hereinafter, described is an example for optically reading out, writing, or erasing information signals from or on a magneto-optical disk by use of the liquid crystal hologram 170 as a second embodiment of the present invention.

In the second embodiment, the liquid crystal hologram 170 is applied with a voltage higher than the first embodiment. In this case, an electric field 19 applied to the liquid crystal 17 in the liquid crystal hologram 170 is formed in a chevron shape as shown in FIG. 5(a).

For this reason, the liquid crystal molecule 21 becomes oblique when seen from the beam direction as shown in FIG. 5(b). Since the liquid crystal molecules are disposed obliquely, the diffraction efficiencies with respect to conjugate waves (i.e. +1-order diffraction light beam and −1-order diffraction light beam) become asymmetrical. Namely, the same effect as the brazed effect can be obtained in this embodiment. An experimental result relating to this embodiment is shown in FIG. 6.

Figure 6:
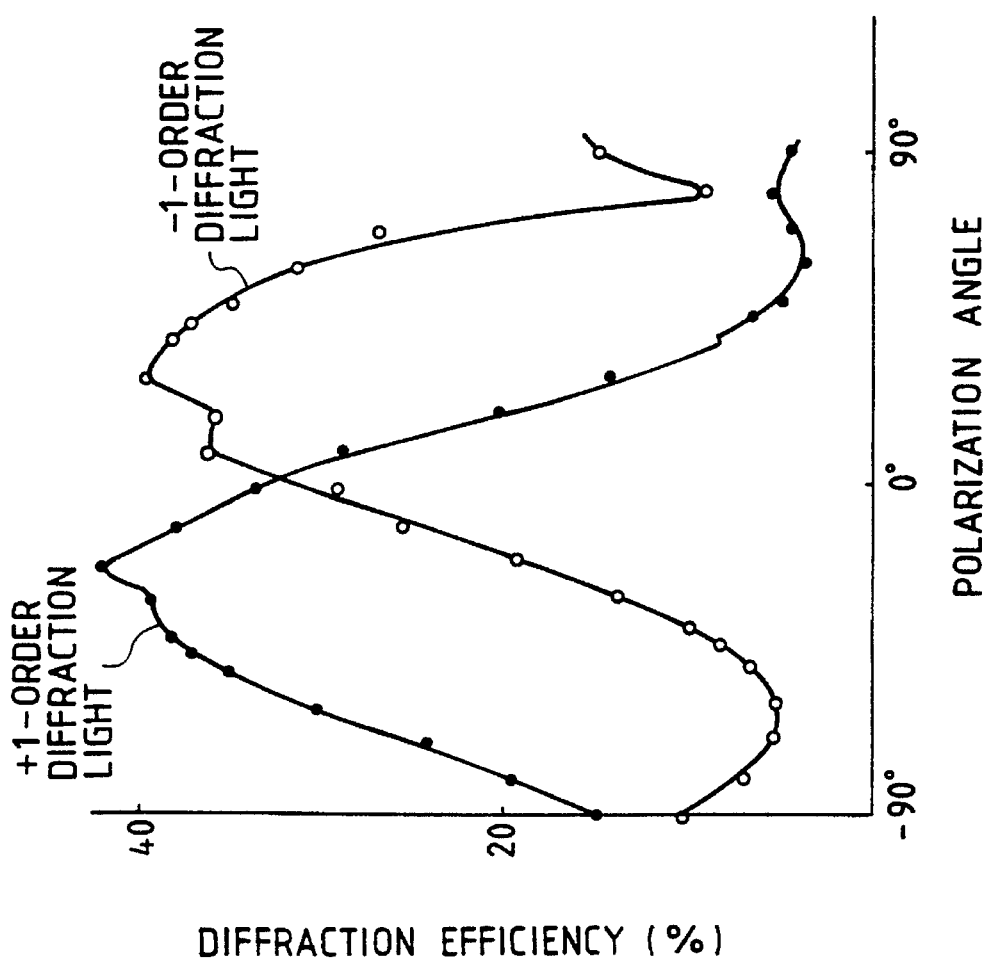
FIG. 6 is a graph showing changes of diffraction efficiencies in the case where a high voltage is applied to the liquid crystal hologram of the second embodiment of the present invention.

FIG. 6 is a graph showing an experimental result of ±1-order diffraction efficiencies measured by supplying a linearly polarized laser beam into the liquid crystal hologram shown in FIG. 2 while applying an AC voltage of 6 V at 3 KHz to this liquid crystal hologram. An abscissa represents a polarization angle, and an ordinate represents a diffraction efficient.

From this graph, it would be understood that the diffraction efficiencies of the +1-order diffraction light beam and the −1-order diffraction light beam change complimentarily in accordance with a polarization angle of an incident light beam.

A fundamental feature of the present invention is to realize an optical pickup head apparatus capable of detecting a polarization angle change caused by a magnetic disk; i.e. information signal, at low cost by use of the minimum number of components, so as to realize a light weight device.

Figure 7:
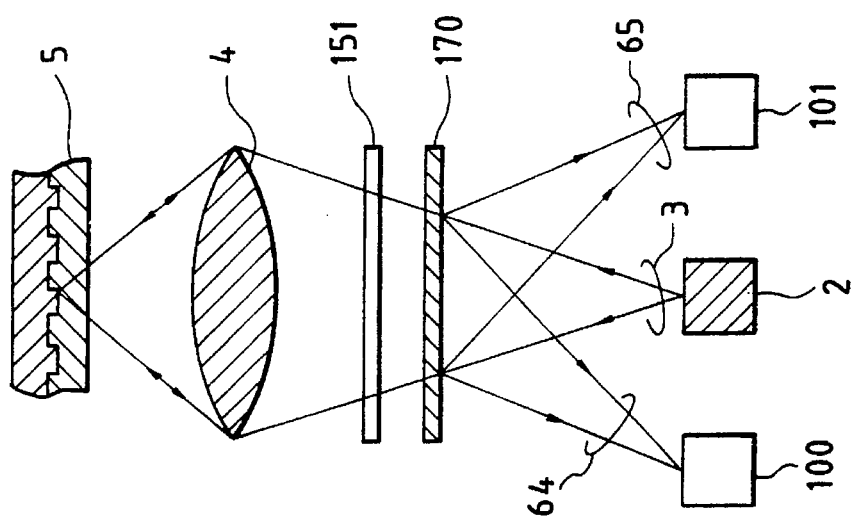
FIG. 7 is a schematic cross-sectional view showing an optical pickup head apparatus in accordance with the second embodiment of the present invention.

In an optical pickup head apparatus shown in FIG. 7, if the polarized direction of the light beam 3 is set toward the X-direction (Θ=±90 degrees) of FIG. 5, little diffraction occurs in the forward light path leading from the radiation light source 2 to the information medium 5 by virtue of the above-described property of liquid crystal hologram 170. Then, after having passed through the liquid crystal hologram 170, the light beam 3 is rotated 45 degrees in its polarized direction by means of a Faraday rotator 151.

Subsequently, on its opposite light path (i.e. on the backward light path), the light beam 3 is further rotated 450 degrees in its polarized direction. Therefore, when the light beam 3 returns to enter into the liquid crystal hologram 170, the polarized direction of the light beam 3 becomes Y-direction (i.e. $\Theta=0$ degree) in FIG. 5. Accordingly, the diffraction efficiencies of the ±1-order diffraction light become high. Thus, an optical pickup head having a high efficiency in utilizing light as well as a high S/N ratio can be realized.

By the way, as is well known, this Faraday rotator 151 can be easily fabricated by a conventional method such as a combination of a magnet and an iron garnet of bismuth substituted rare earth element.

Furthermore, in the case where a magneto-optical disk is used as the information medium 5, when the light beam hits a pit formed on an information surface of the information medium 5, the polarized direction is rotated due to magneto-optical effect. Then, on the backward light path, when the light beam passes the Faraday rotator 151, the polarized direction is offset from 0 degree.

With such a polarization angle change of the light beam, a returning light beam from the information medium 5 has a polarization angle change being changed in accordance with an information signal. Therefore, this polarization angle change is shown by a difference signal between an electric signal obtained from the photodetector unit 100 upon receipt of +1-order diffraction light beam and an electric signal obtained from the photodetector unit 101 upon receipt of −1-order diffraction light beam or by an AC component of this difference signal, as shown in FIG. 6 or 7.

Thus obtained information signal is advantageous in its stability. This is, this information signal is derived from differential detection between the +1-order diffraction light beam and the −1-order diffraction light beam. Therefore, bad affection of light quantity variation caused by the change of the radiation light source itself or by flaw of the information medium can be canceled by this differential nature.

In the second embodiment, if it required to increase an optical output of the information medium 5 in the case where information is written in or erased, it brings a best result to lower a voltage applied to the liquid crystal hologram 170 when information is written in and erased and, to the contrary, to increase a voltage applied to the liquid crystal hologram 170 where information is read out.

For instance, in case of the liquid crystal hologram used in the previously described experiment, by applying a voltage of approximately 3 V in writing or erasing information, the diffraction efficiency can be lowered in the forward light path leading from the radiation light source 2 to the information medium 5 (with a 90-degree polarized direction) as can be understood from FIG. 4. Namely, by increasing a permeability on the forward light path, the optical output from lens can be increased.

On the other hand, when information is read out, the voltage applied to the liquid crystal hologram 170 is increased up to approximately 6 V. Thus, information is read out from the magneto-optical disk as previously described.

In accordance with this embodiment, the permeability of the forward light path can be increased by applying a lower voltage to the liquid crystal hologram in order to ensure a writing in or erasing operation of information to a recording (information) medium. Accordingly, a light quantity of light spot for writing or erasing on the information medium can be increased.

To the contrary, in the case where information is read out, a higher voltage is applied to the liquid crystal hologram so that the liquid crystal hologram has the same effect as the brazed effect. Thus, information signals can be read out stably even when an optical pickup head apparatus constituted by minimum number of parts is used in association with a magneto-optical disk.

Third Embodiment

Figure 8:
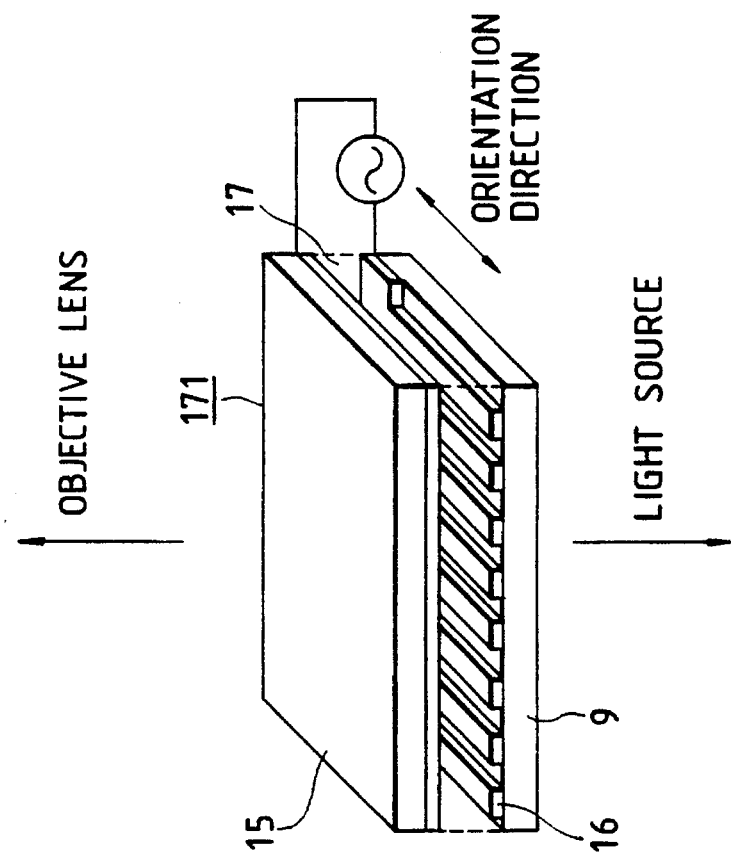
FIG. 8 is a perspective view showing a liquid crystal hologram serving as one component of the optical pickup head apparatus of a third embodiment of the present invention.

FIG. 8 shows a third embodiment of the present invention. In this embodiment, a quarter wavelength plate 15 is used in place of one of transparent substrates 9 shown in FIG. 2 which is provided closer to the objective lens 4. Namely, the quarter wavelength plate 15 of FIG. 1 needs not to be specially provided in this embodiment since the liquid crystal hologram 171 can serve as the quarter wavelength plate as well.

Figure 9:
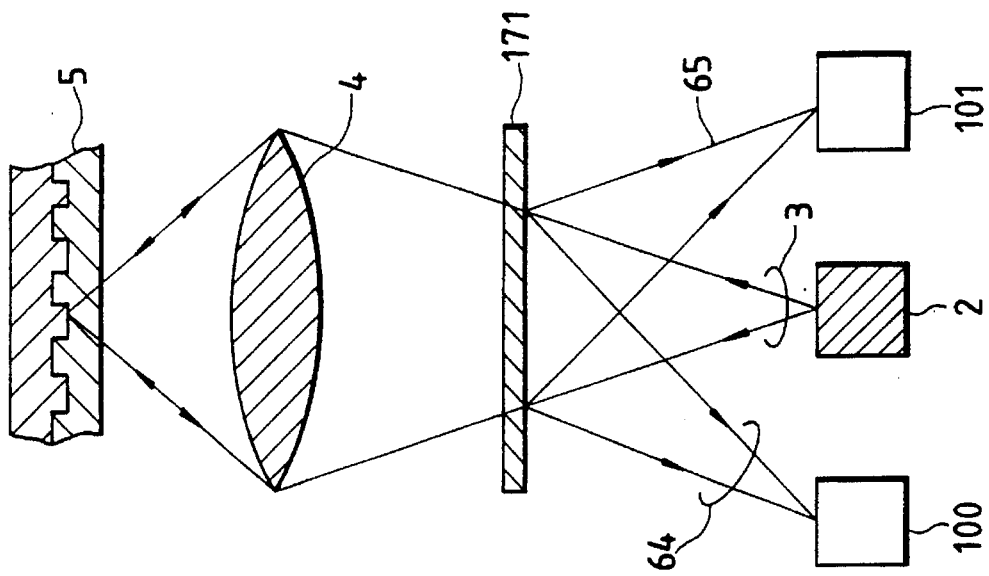
FIG. 9 is a schematic cross-sectional view showing an optical pickup head apparatus in accordance with the third and fourth embodiments of the present invention.

With this arrangement, as shown in FIG. 9, overall part number can be further reduced to constitute a small-sized, light-weight, and low-cost optical pickup head apparatus, while ensuring the same performance as the first embodiment.

Fourth Embodiment

Figure 10:
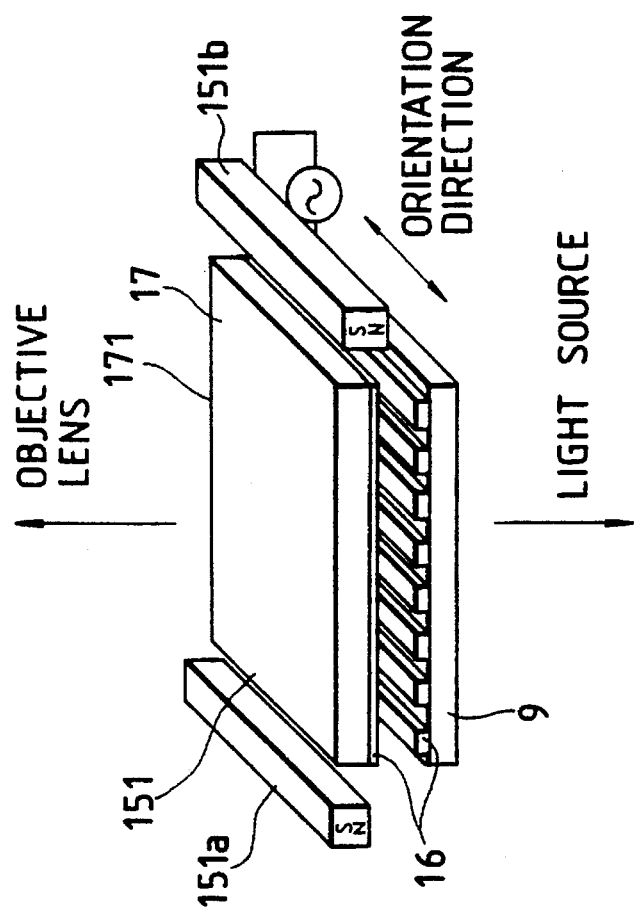
FIG. 10 is a perspective view showing a liquid crystal hologram serving as one component of the optical pickup head apparatus of the fourth embodiment of the present invention.

FIG. 10 shows a fourth embodiment of the present invention. In this embodiment, a dielectric substrate constituting a Faraday rotator 151 is used in place of one of transparent substrates 9 shown in FIG. 2 which is provided closer to the objective lens 4. Namely, the Faraday rotator 151 of FIG. 1 needs not to be specially provided in this embodiment since the liquid crystal hologram 171 can serve as the Faraday rotator as well. That is, in the same manner as the third embodiment, with this arrangement, overall part number can be further decreased to constitute a small-sized, light-weight, and low-cost optical pickup head apparatus, while ensuring the same performance as the second embodiment.

By the way, in FIG. 10, magnets 151a and 151b serve as measures for applying a magnetic field required for causing a Faraday rotation. However, it is needless to mention that these magnets can be substituted by any other measures which can generate the required magnetic field.

Focusing Error (FE) Signal Detection

Figure 11:
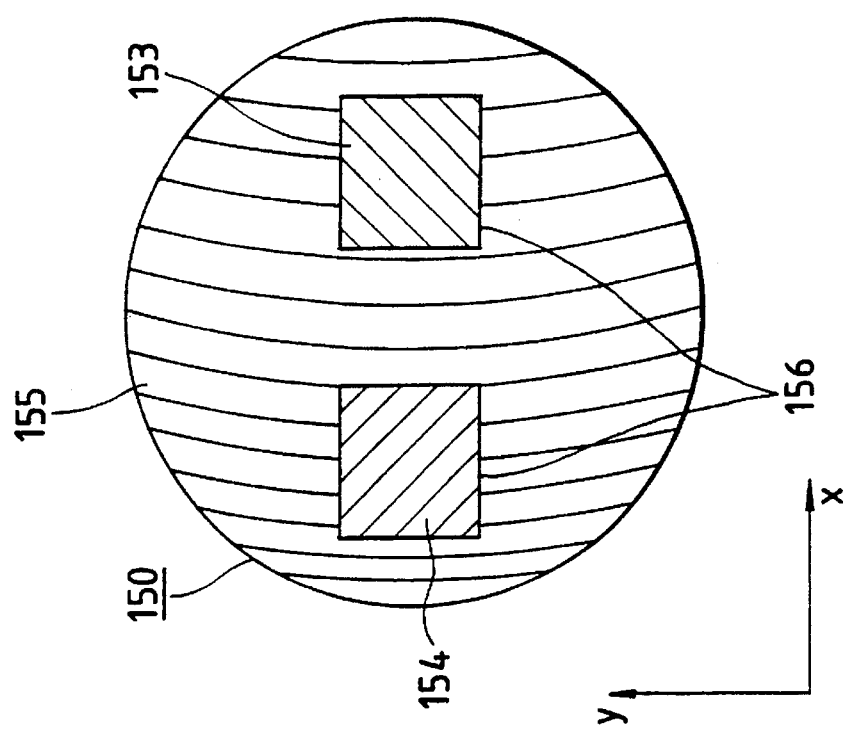
FIG. 11 is a plane view showing a hologram pattern of the liquid crystal hologram in accordance with embodiments of the present invention.

The following description explains an embodiment for realizing detections of a focusing error (FE) signal and a tracking error (TE). FIG. 11 shows a typical hologram pattern of the transparent electrode constituting the liquid crystal hologram in accordance with the present invention. In FIG. 11, reference numerals 153 and 154 denote divided hologram regions for generating diffraction lights in order to detect the TE signals, and a reference signal 155 denotes a divided hologram region for generating a diffraction light in order to detect the FE signal.

Figure 12:
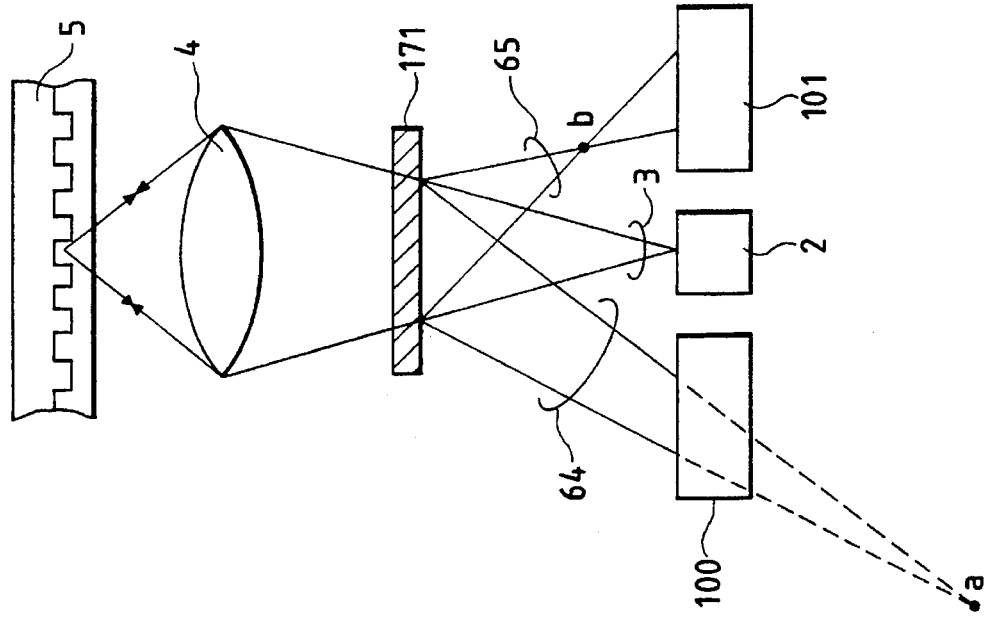
FIG. 12 is a schematic cross-sectional view of the optical pickup head for illustrating diffraction light beams (spherical waves)

The hologram pattern constituting the region 155 can be produced through a computer generated hologram (CGH) method which carries out a calculation for obtaining interference fringes on the liquid crystal hologram 171 of FIG. 12 formed by interference between the light beam 3 and the +1-order diffraction light beam 84 or interference between the light beam 3 and the −1-order diffraction light beam 65.

Here, the +1-order diffraction light beam 64 is a spherical wave having its focal point behind the photodetector unit 100; i.e. at a point a below the photodetector unit 100 in FIG. 12. On the other hand, the −1-order diffraction light beam 65 is a spherical wave having its focal point in front of the photodetector unit 101; i.e. at a point b above the photodetector unit 101.

Figure 13A:
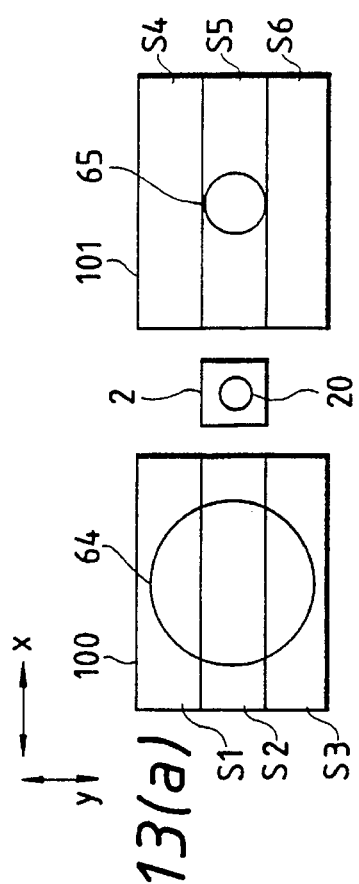
FIGS. 13(a)–13(c) are plane views showing the diffraction light beams on the photodetectors.
Figure 13B:
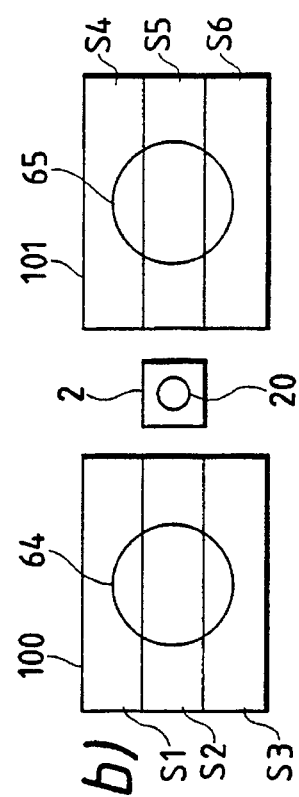
Figure 13C:
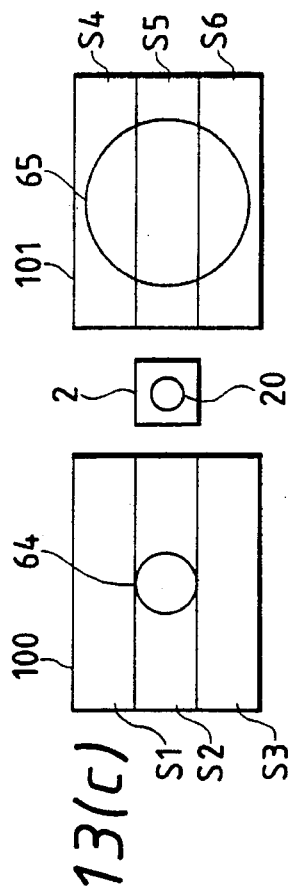

FIG. 13 shows the +1-order diffraction light beam 64 and the −1-order diffraction light beam 65 detected on the photodetector units 100 and 101, respectively. FIG. 13(b) shows a just focus condition, and FIGS. 13(a) and 13(c) show defocus conditions. Accordingly, the focus error signal FE can be calculated as follows:

$$FE=(S1-S2+S3)-(S4-S5+S6) \quad (1)$$

or $$FE=S5-S2 \quad (2)$$

In general, when the light beam 3 emitted from the radiation light source 2 causes a variation in its wavelength, the diffraction light beams 64 and 65 shift toward X-direction in FIG. 13. However, such shift movements of diffraction light beams 64 and 65 do not affect the FE signal obtained in accordance with above-described calculation.

Although, for the purpose of simplifying the explanation, two diffraction light beams 64, 65 in FIGS. 12 and 13 are depicted as spherical wave, it would be understood from FIGS. 12, 13 and the equations (1), (2) that essentially required are the diffraction light beam 65 converging in front of the photodetector unit 101 and its conjugate diffraction light beam 64 converging behind the photodetector unit 100. Therefore, it is needless to say that light beams having focal lines instead of focal points may be used in this invention.

Tracking Error (TE) Signal Detection

Figure 14:
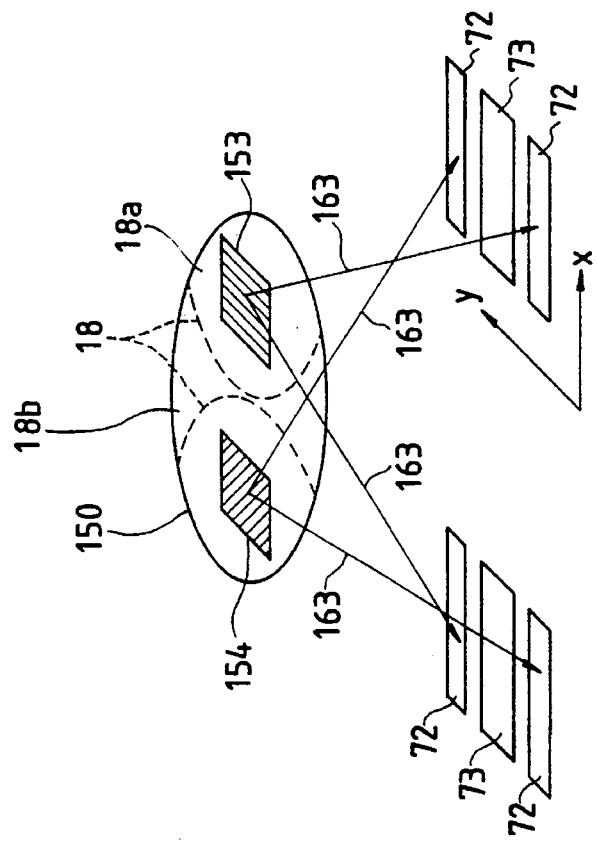
FIG. 14 is a schematic perspective view showing essential parts (hologram patterns and photodetectors) of the optical pickup head apparatus in accordance with embodiments of the present invention.

Next, an embodiment for detecting the TE signal is explained. In FIG. 14, reference numerals 153 and 154 denote diffraction light beam generating regions for detecting the TE signals of the hologram pattern as well as FIG. 11. Further, a reference numeral 72 denotes a photodetector for detecting the TE signal.

A light beam reflected at the information medium 5 has a diffraction pattern being formed when the light beam is diffracted by track grooves on the information medium 5. This diffraction pattern is referred to as a far-field pattern 18.

With this far-field pattern 18, a light quantity distribution on the hologram is varied in response to a change of mutual position between the converging spot and the track groove on the information medium 5.

For example, if it is supposed that the Y-direction of FIG. 14 is parallel with the track grooves, the change of light quantity occurs in such a manner that the far-field pattern of +X-direction (18a) becomes bright and the far-field pattern of −X-direction (18b) becomes dark or, on the contrary, the farfield pattern of +X-direction (18a) becomes dark and the farfield pattern of −X-direction (18b) becomes bright.

Accordingly, the TE signal can be obtained in the tracking error signal detecting photodetectors 72 by sensing the diffraction light beams 163 fed from the diffraction regions 153 and 154.

Figure 15:
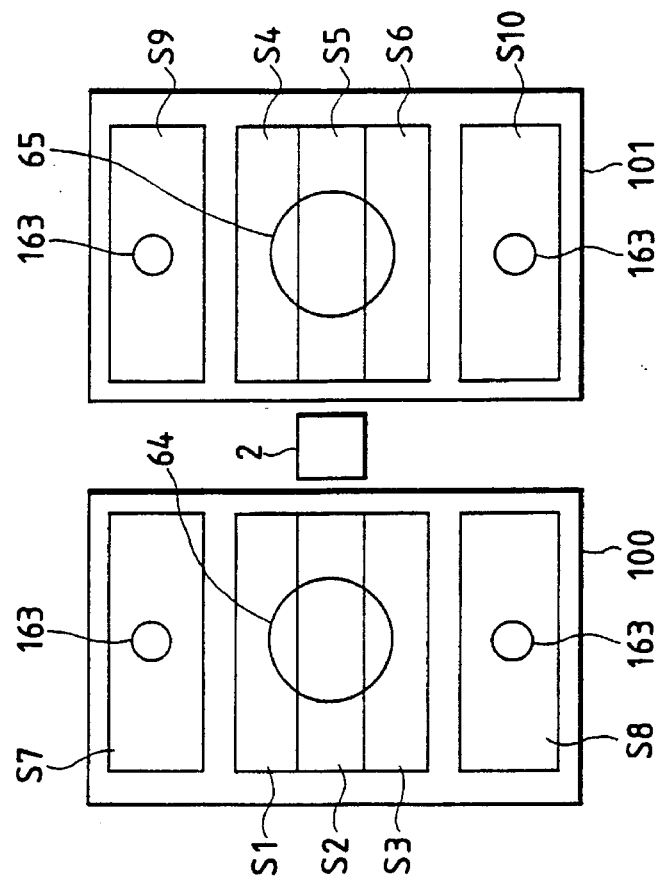
FIG. 15 is a plane view showing the diffraction light beams on the photodetectors.

FIG. 15 shows diffraction light beams on the photodetector units 100 and 101. In FIG. 15, detecting portions S7 to S10 correspond to the tracking error signal detecting photodetector units 72 in FIG. 14. In this case, the tracking error signal TE can be calculated as follows:

$$TE=(S7+S9)-(S8+S10) \quad (3)$$

Figure 25A:
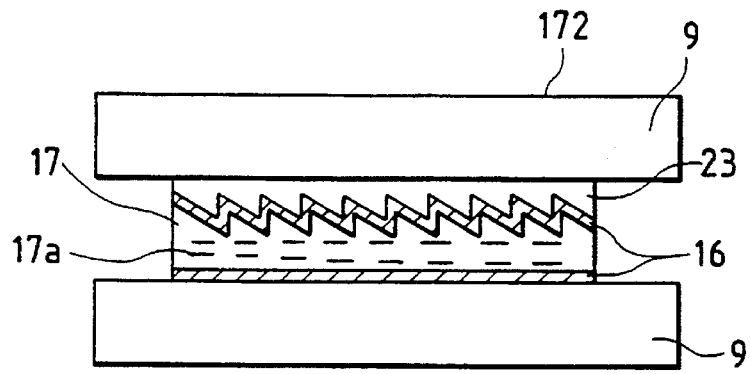
FIGS. 25(a)–25(b) are schematic cross-sectional views showing a liquid crystal hologram serving as one component of the conventional optical pickup head apparatus.
Figure 25B:
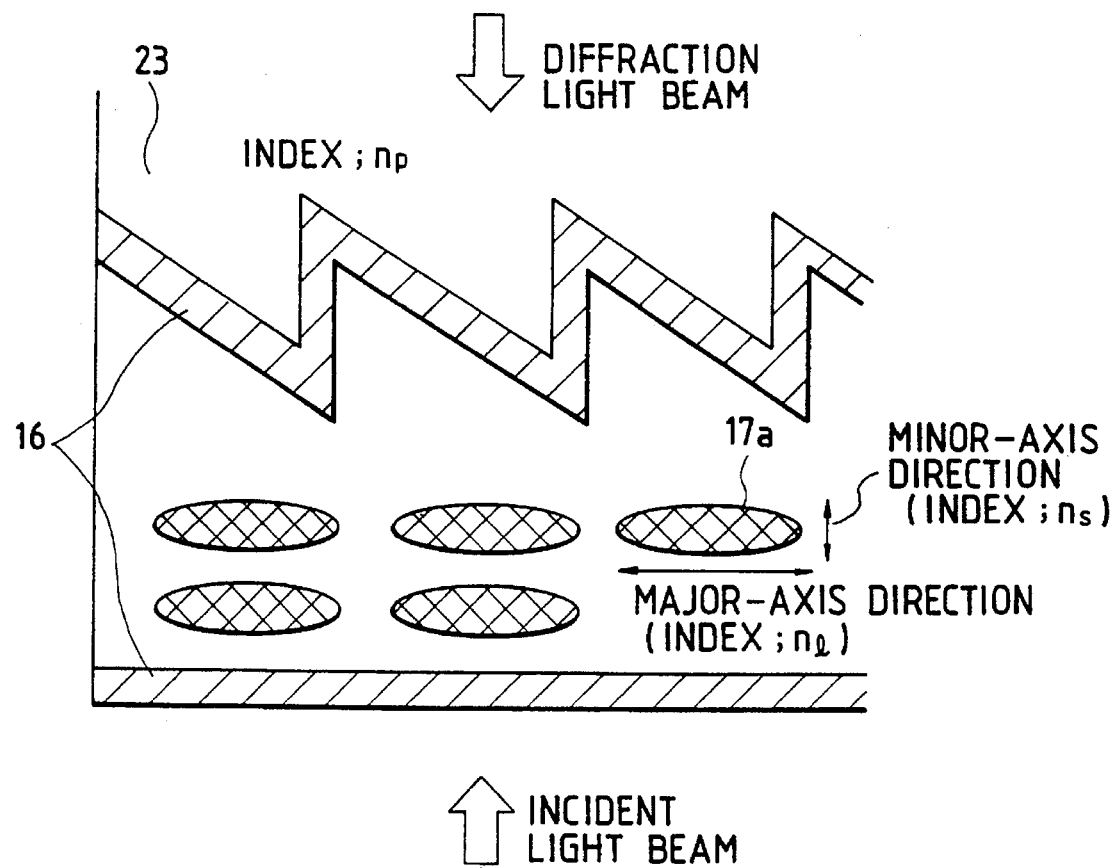

As is described previously there was a problem in the conventional system such that the polyimide layer needs to be formed to have a brazed cross-sectional configuration as shown in FIG. 25(a) and therefore it was difficult even to provide the hologram curves, however the present invention does not require to fabricate the brazed cross-sectional configuration. That is, the liquid crystal hologram adopted in the present invention can be obtained by merely patterning transparent electrodes to form a hologram pattern by use of photo-mask manufactured as an application of an integrated circuit technology. This is advantageous in making the hologram pattern have curvature, or in exchanging the hologram pattern partly with a different hologram pattern.

By the way, it is desirable to provide transparent electrodes on the boundary lines 156 sectioning hologram segment regions 153, 154, and 155 so that all the transparent electrodes of the hologram segment regions can be applied with voltages.

Various Modifications of First to Fourth Embodiments

Figure 17:
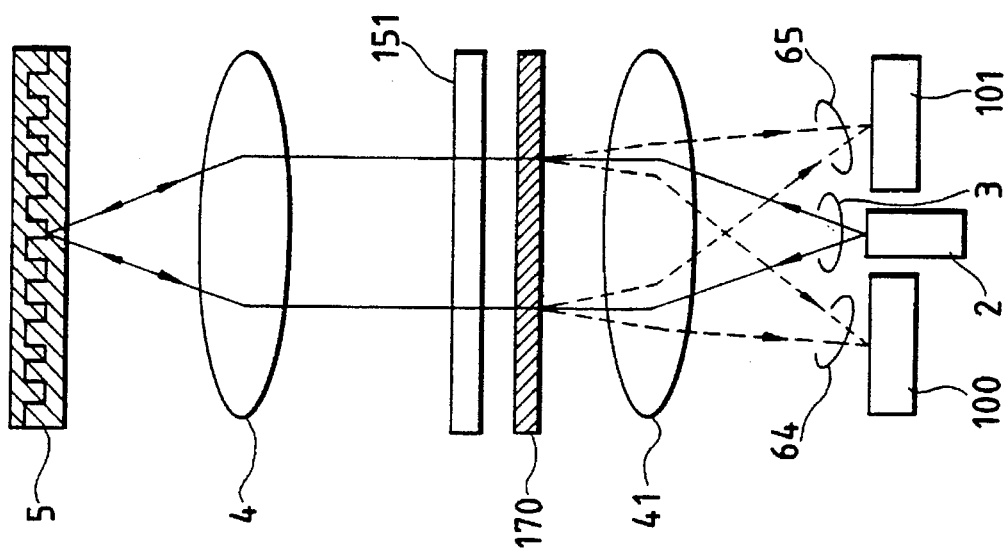
FIG. 17 is a schematic cross-sectional view showing one modified embodiment of the optical pickup head apparatus of FIG. 7.
Figure 16:
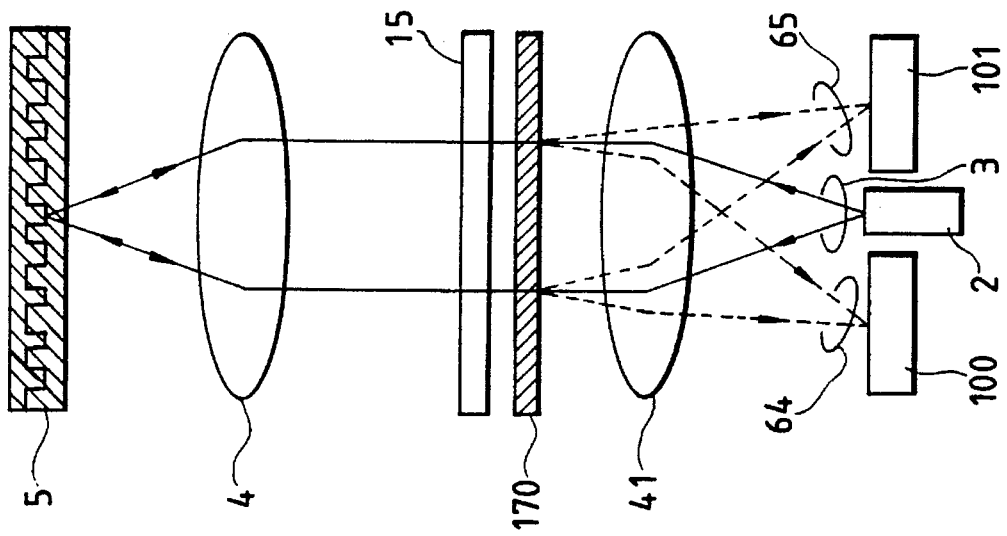
FIG. 16 is a schematic cross-sectional view showing one modified embodiment of the optical pickup head apparatus of FIG. 1.
Figure 18:
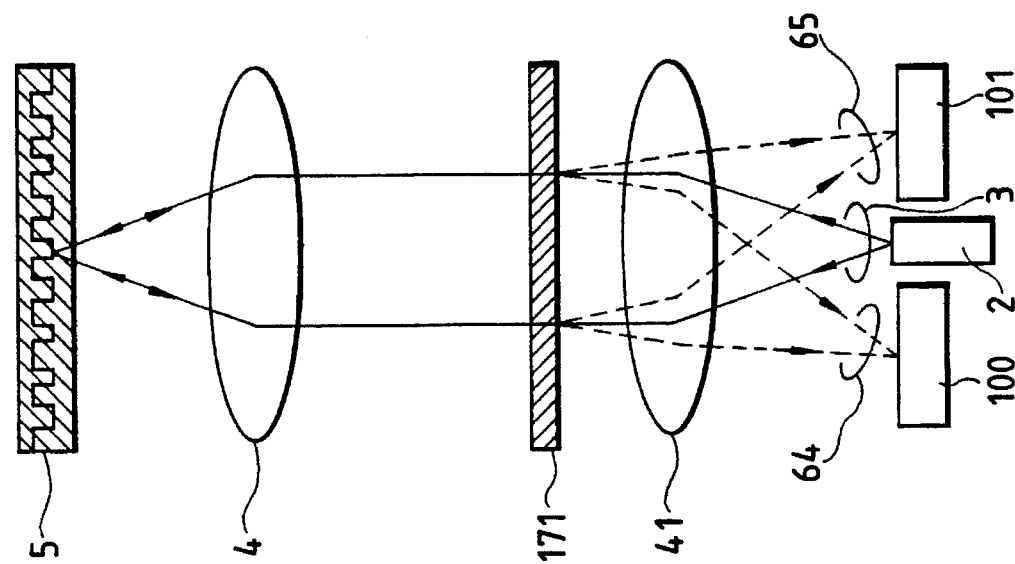
FIG. 18 is a schematic cross-sectional view showing one modified embodiment of the optical pickup head apparatus of FIG. 9.

Though the embodiments shown in FIGS. 1, 7, and 9 disclose finite optical systems which do not adopt collimator lenses so as to reduce the size and part number of the optical pickup head apparatus, the present invention can be realized even if the collimator lenses 41 are disposed between the liquid crystal hologram 170 or 171 and the radiation light source 2 to change the imaging optics to an infinite system, as shown in FIGS. 16, 17, and 18. With this arrangement, no aberration is generated in the diffraction light beam even if wavelength variation occurs. Furthermore, this arrangement is advantageous in that the diffraction efficiencies become uniform since substantially parallel light beams enter the liquid crystal hologram.

Figure 19:
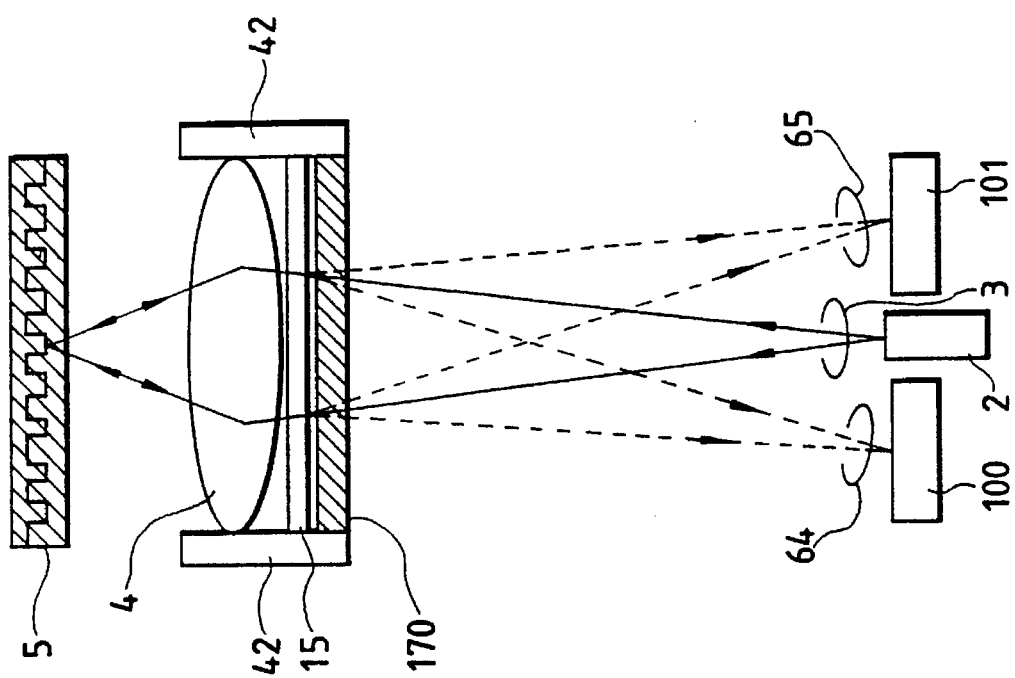
FIG. 19 is a schematic cross-sectional view showing another modified embodiment of the optical pickup head apparatus of FIG. 1.
Figure 21:
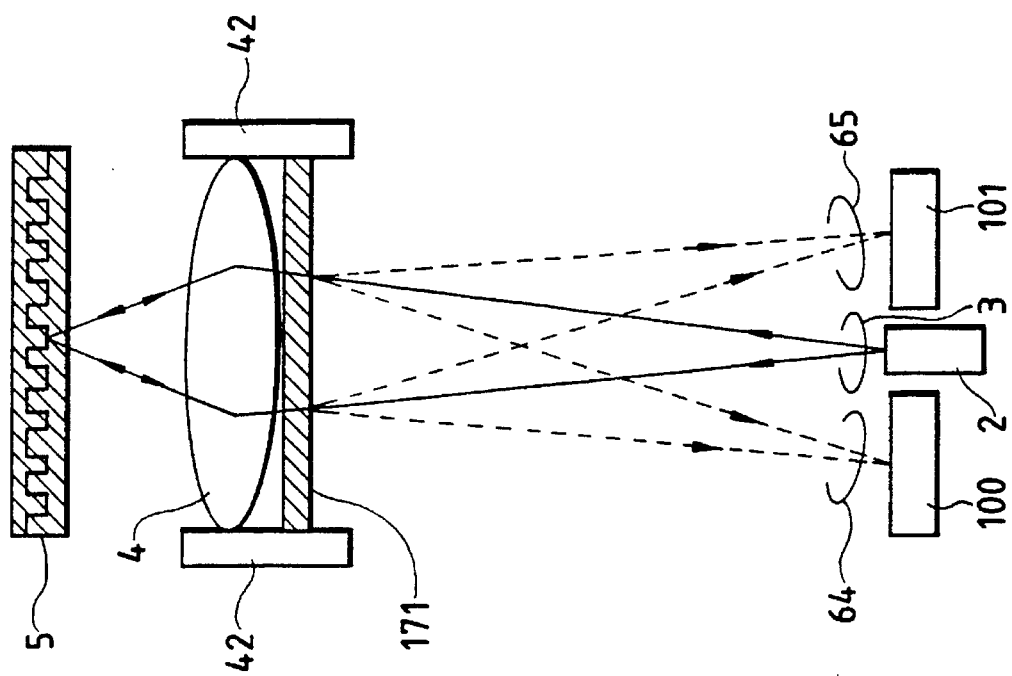
FIG. 21 is a schematic cross-sectional view showing another modified embodiment of the optical pickup head apparatus of FIG. 9.
Figure 20:
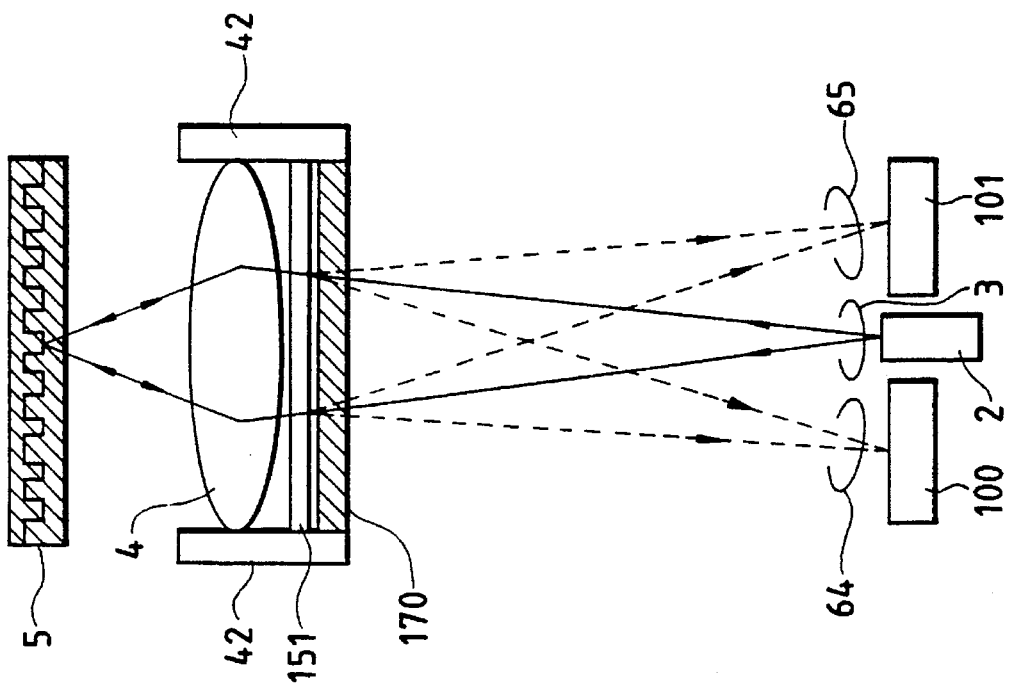
FIG. 20 is a schematic cross-sectional view showing another modified embodiment of the optical pickup head apparatus of FIG. 7.

Next, the objective lens 4 and the liquid crystal hologram 170 or 171 in the embodiments of FIGS. 1, 7, and 9 can be assembled in a holder 42 so as to be shifted together, as shown in FIGS. 19, 20, and 21. With this arrangement, no light beam shift occurs on the liquid crystal hologram 170 or 171 even if the objective lens 4 changes its position to follow tracks. Therefore, an offset of the TE signal or a reduction in sensitivity of the FE signal can be prevented from being generated.

As the embodiments of FIGS. 19–21 allow the polarizing hologram beamsplitter, such as element 170 or 171, to be positioned close to the objective lens 4 and far from the photodetector units 100 and 101, the effective diameter of the polarizing hologram beamsplitter can be enlarged even in the finite optical system, thus allowing a relatively large positional error in installing the polarizing hologram beamsplitter into an optical head apparatus and, therefore, reducing cost of installation.

Figure 22:
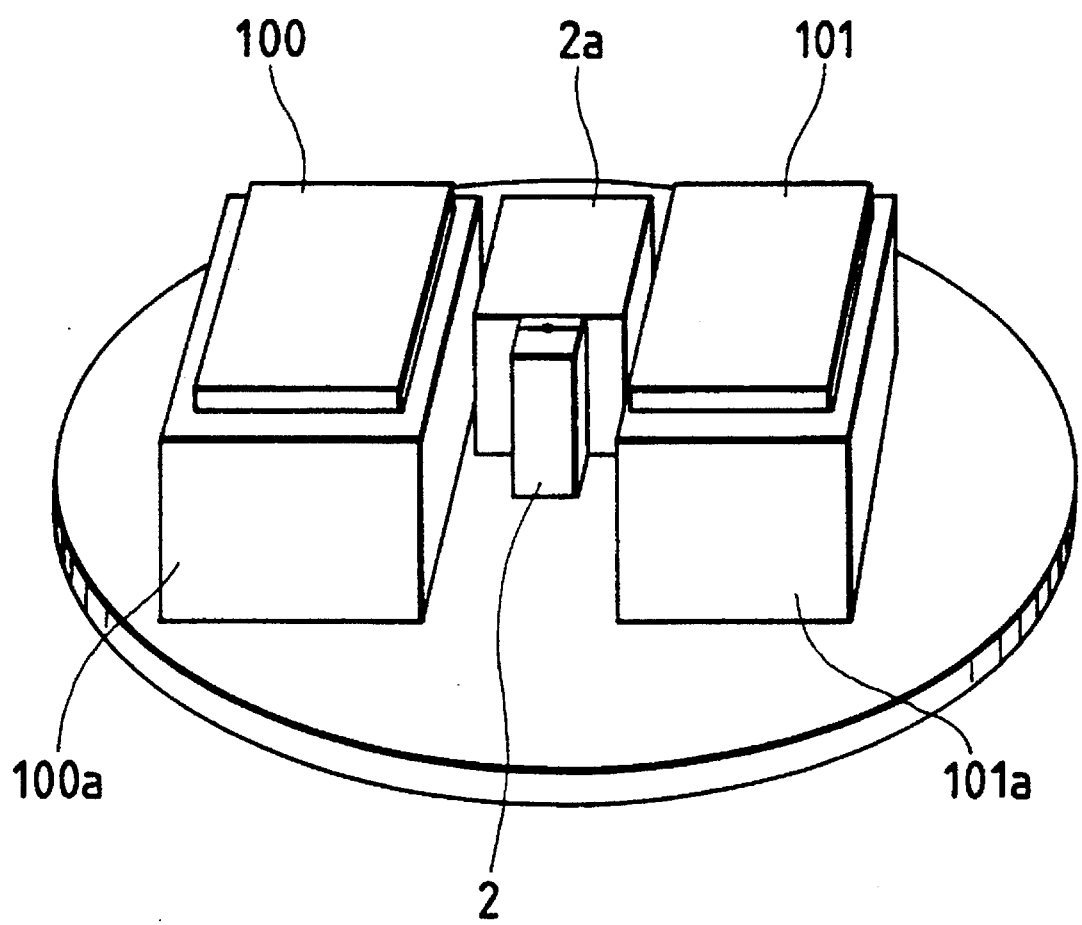
FIG. 22 is a schematic perspective view showing a module in which photodetector units and a radiation light source are integrally mounted.

Furthermore, if the diffraction angle of the diffraction beam light is set small in the present invention, it becomes possible to dispose the photodetector units 100 and 101 close to the radiation light source 2 so as to put it therebetween as shown in FIG. 22. In FIG. 22, reference numerals 2a, 100a, and 101a denote mount members for mounting radiation light source 2 and the photodetectors 100 and 101, respectively. With this arrangement, it becomes possible to eliminate mutual displacement of components due to temperature variation. And, therefore, the temperature characteristics of the optical pickup head apparatus can be further improved.

Fifth Embodiment

Moreover, FIG. 23 shows a fifth embodiment of the present invention. In this embodiment, all the optical components such as the radiation light source 2, the photodetector units 100 and 101, the liquid crystal hologram 170 and the quarter wavelength plate 15 (or the Faraday rotator), or the liquid hologram 171, and the objective lens 4 are assembled as a unit by an overall optical system holder 200.

With this arrangement, a mutual position between the objective lens 4 and the radiation light source 2 is not varied even when the objective lens 4 changes its position to follow the tracks. For this reason, an occurrence of aberration can be further suppressed. Accordingly, the objective lens 4 can be reduced its size and manufactured thin so as to realize a further small-sized, thin, optical pickup head apparatus.

As this invention mat be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. An optical pickup head apparatus comprising:

a radiation light source emitting a linearly polarized light beam;

an imaging optics which receives said linearly polarized light beam emitted from said radiation light source, and converges the linearly polarized light beam to a small spot on an information medium;

photodetector units including a plurality of photodetectors which receive the light beam being reflected and diffracted at the information medium and output electric signals in accordance with received light quantities;

a liquid crystal hologram which is constituted by a pair of transparent substrates, a liquid crystal sandwiched between these transparent substrates, and a pair of transparent electrodes disposed between the liquid crystal and the transparent substrates, either of said transparent electrodes being formed with a hologram pattern;

one of said two transparent substrates constituting the liquid crystal hologram being made by a dielectric substrate serving as one component of a Faraday rotator which rotates a polarized direction of said light beam by 45 degrees in a forward optical path leading from said radiation light source to said information medium and, further, rotates the polarized direction of said light beam by 45 degrees in a backward optical path leading from said information medium to said photodetector units;

said liquid crystal hologram being applied a voltage in a reading-out operation of information signal higher than a voltage in a writing-in operation of the information signal, so that said light beam reflected from the information medium is diffracted in the liquid crystal hologram to generate ±1-order diffraction light beams; and said photodetectors sensing both of light quantities of said ±1-order diffraction light beams emitted from the liquid crystal hologram and calculating a subtraction between signals representing said light quantities so as to obtain the information signal.

2. An optical pickup head apparatus comprising:

a radiation light source emitting a linearly polarized light beam;

an imaging optics which receives a light beam emitted from said radiation light source, and converges the light beam to a small spot on an information medium;

photodetector units including a plurality of photodetectors which receive the light beam being reflected and diffracted at the information medium and output electric signals in accordance with received light quantities;

a liquid crystal hologram which includes a liquid crystal of which a molecular axis is uniformly aligned in parallel to a substrate of said liquid crystal;

said liquid crystal hologram having a transparent substrate located closer to said information medium, said transparent substrate being made by a quarter wavelength plate which converts said linearly polarized light beam into a circular polarized light beam in a forward optical path leading from said radiation light source to said information medium and, to the contrary, restores thus converted circular polarized light beam into a linearly polarized light beam in a backward optical path leading from said information medium to said photodetector units; and said photodetector units sensing light quantities of ±1-order diffraction light beams emitted from the liquid crystal hologram and calculating a summation of signals representing said light quantities so as to obtain an information signal.

3. An optical pickup head apparatus comprising:

a radiation light source emitting a linearly polarized light beam;

an imaging optics which receives the linearly polarized light beam emitted from said radiation light source, and converges the linearly polarized light beam to a small spot on an information medium;

photodetector units including a plurality of photodetectors which receive the light beam being reflected and diffracted at the information medium and output electric signals in accordance with received light quantities;

a liquid crystal hologram which includes a liquid crystal of which a molecular axis is uniformly aligned in parallel to a substrate of said liquid crystal;

a Faraday rotator which rotates a polarized direction of said light beam by 45 degrees in a forward optical path leading from said radiation light source to said information medium and, further, rotates the polarized direction of said light beam by 45 degrees in a backward optical path leading from said information medium to said photodetector units; and said photodetector units sensing both of light quantities of ±1-order diffraction light beams emitted from the liquid crystal hologram and calculating a subtraction between signals representing said light quantities so as to obtain an information signal.

4. An optical pickup head apparatus comprising:

a radiation light source emitting a linearly polarized light beam;

an imaging optics which receives said linearly polarized light beam emitted from said radiation light source, and converges the linearly polarized light beam to a small spot on an information medium;

photodetector units including a plurality of photodetectors which receive the light beam being reflected and diffracted at the information medium and output electric signals in accordance with received light quantities;

a liquid crystal hologram which includes a liquid crystal of which a molecular axis is uniformly aligned in parallel to a substrate of said liquid crystal;

a transparent substrate constituting the liquid crystal hologram being made by a dielectric substrate serving as one component of a Faraday rotator which rotates a polarized direction of said light beam by 45 degrees in a forward optical path leading from said radiation light source to said information medium and, further, rotates the polarized direction of said light beam by 45 degrees in a backward optical path leading from said information medium to said photodetector units; and said photodetectors sensing both of light quantities of ±1-order diffraction light beams emitted from the liquid crystal hologram and calculating a subtraction between signals representing said light quantities so as to obtain an information signal.

5. An optical pickup head apparatus comprising:

a radiation light source emitting a linearly polarized light beam;

an imaging optics which receives said linearly polarized light beam emitted from said radiation light source, and converges the linearly polarized light beam to a small spot on an information medium;

photodetector units including a plurality of photodetectors which receive the light beam being reflected and diffracted at the information medium and output electric signals in accordance with received light quantities;

a liquid crystal hologram which is constituted by a pair of transparent substrates, a liquid crystal sandwiched between these transparent substrates, and a pair of transparent electrodes disposed between the liquid crystal and the transparent substrates, either of said transparent electrodes being formed with a hologram pattern;

a Faraday rotator which rotates a polarized direction of said light beam by 45 degrees in a forward optical path leading from said radiation light source to said information medium and, further, rotates the polarized direction of said light beam by 45 degrees in a backward optical path leading from said information medium to said photodetector units;

said liquid crystal hologram being applied a voltage in a reading-out operation of information signal higher than a voltage in a writing-in operation of the information signal, so that said light beam reflected from the information medium is diffracted in the liquid crystal hologram to generate ±1-order diffraction light beams; and said photodetectors sensing both of light quantities of ±1-order diffraction light beams emitted from the liquid crystal hologram and calculating a subtraction between signals representing said light quantities so as to obtain the information signal.

6. An optical pickup head apparatus comprising:

a radiation light source emitting a linearly polarized light beam;

an imaging optics which receives a light beam emitted from said radiation light source, and converges the light beam to a small spot on an information medium;

photodetector units including a plurality of photodetectors which receive the light beam being reflected and diffracted from the information medium and output electric signals in accordance with received light quantities;

a liquid crystal hologram which includes a liquid crystal of which a molecular axis is uniformly aligned in parallel to a substrate of said liquid crystal;

a quarter wavelength plate which converts said linearly polarized light beam into a circular polarized light beam in a forward optical path leading from said radiation light source to said information medium and, to the contrary, restores thus converted circular polarized light beam into a linearly polarized light beam in a backward optical path leading from said information medium to the photodetector units; and said photodetector units sensing both of light quantities of ±1-order diffraction light beams emitted from the liquid crystal hologram and calculating a summation of signals representing said light quantities so as to obtain an information signal.

7. An optical pickup head in accordance with claim 6 in which an alternating-current component of a calculated result obtained from said photodetector units is used for obtaining the information signal.

8. An optical pickup head apparatus in accordance with claim 6 in which said +1-order diffraction light beam emitted from the liquid crystal hologram converges in front of, a corresponding photodetector unit, and its conjugate −1-order diffraction light beam is a spherical wave having a focal point behind the photodetector.

9. An optical pickup head apparatus in accordance with claim 6 in which a hologram surface is dissected into several regions, and a tracking error signal is obtained by receiving diffraction light beams emitted from two of said regions by the photodetector unit and calculating a difference signal corresponding to a difference between two diffraction light beams.

10. An optical pickup head apparatus in accordance with claim 6 further comprising a collimator lens disposed between the liquid crystal hologram and the radiation light source.

11. An optical pickup head apparatus in accordance with claim 6 in which the imaging optics and the liquid crystal hologram are assembled in a holder so as to be shifted together.

12. An optical pickup head apparatus in accordance with claim 6 in which the radiation light source and the photodetector units are mounted close with each other as a unit.

13. An optical pickup head apparatus in accordance with claim 6 in which optical components including the radiation light source, the imaging optics, the photodetector units, the liquid crystal hologram and the quarter wavelength plate are assembled as a unit by an optical system holder.

* * * * *